(12) United States Patent  (10) Patent No.: US 8,155,087 B2
Shibata  (45) Date of Patent: Apr. 10, 2012

(54) WIRELESS COMMUNICATION DEVICE (75) Inventor: Manabu Shibata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 283 days.

(21) Appl. No.: 12/691,514

(22) Filed: Jan. 21, 2010

(65) Prior Publication Data

US 2010/0118694 A1 May 13, 2010

Related U.S. Application Data (63) Continuation of application No. PCT/JP2007/000832, filed on Aug. 2, 2007.

(51) Int. Cl.
H04W 36/24 (2009.01)
(52) U.S. Cl. ......................... 370/331; 370/500
(58) Field of Classification Search .................. 370/331, 370/500; 455/442
See application file for complete search history.

(56) References Cited

U.S. PATENT DOCUMENTS

2004/0258098 A1* 12/2004 Ohkubo et al. ............... 370/503
2006/0078040 A1* 4/2006 Sung et al. .................... 375/140
2006/0245390 A1 11/2006 Omoto
2008/0095108 A1* 4/2008 Malladi et al. ................ 370/329
2010/0008246 A1* 1/2010 Watanabe ..................... 370/252
2011/0096751 A1* 4/2011 Ma et al. ....................... 370/331

FOREIGN PATENT DOCUMENTS

JP 2000-134667 5/2000
JP 2002-300628 10/2002
JP 2006-333452 12/2006

OTHER PUBLICATIONS

International Search Report received in PCT/JP2007/000832 dated Sep. 18, 2007.

* cited by examiner

Primary Examiner — Melvin Marcelo
(74) Attorney, Agent, or Firm — Murphy & King, P.C.

(57) ABSTRACT

The mobile station performs Fourier transform of a signal received from a base station presently in communication in parallel to demodulation processing, by means of a plurality of FFT each having FFT start timing shifted one after another, so as to detect the synchronous timing of another base station by detecting correlation through a pattern comparison with a subcarrier signal including the pilot signal of the other base station.

8 Claims, 11 Drawing Sheets

WIRELESS COMMUNICATION DEVICE

CROSS REFERENCE TO RELATED APPLICATION

This application is a continuation of International Application No. PCT/JP 2007/000832, filed on Aug. 2, 2007, now pending, herein incorporated by reference.

TECHNICAL FIELD

The present invention relates to a mobile station in a wireless communication system using a multicarrier transmission method [for example, OFDM (Orthogonal Frequency Divisional Multiplexing, including OFDMA)]. In particular, in order that the mobile station, moving between base stations, performs handover processing etc., the present invention is appropriate for the mobile station to perform synchronous timing detection processing with another base station while communicating with a present base station.

BACKGROUND ART

The multicarrier transmission method performs parallel data transmission by dividing the data into a plurality of subcarriers. Since a symbol period can be elongated as compared to single carrier transmission, transmission deterioration caused by multipath can be reduced. Also, since OFDM, which is an efficient means to realize the multicarrier transmission, performs signal transmission by means of a plurality of orthogonal subcarriers, high frequency use efficiency and high-speed transmission can be achieved.

Figure 1A:
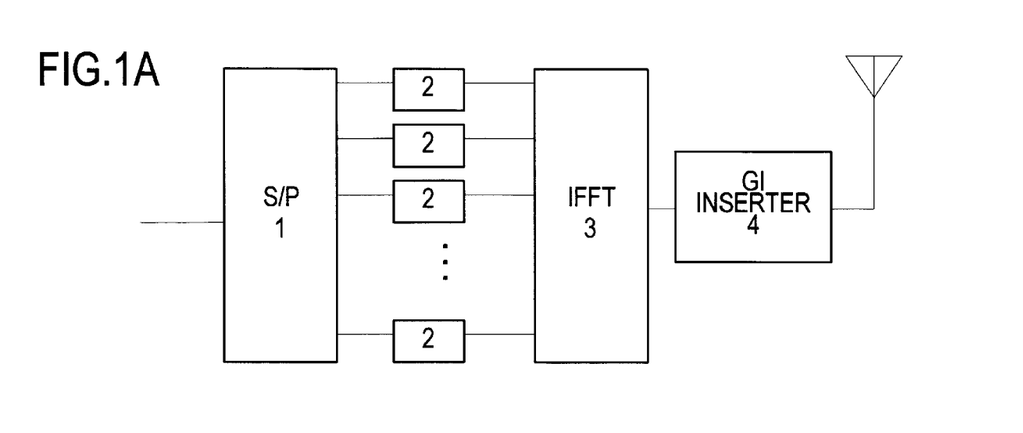
FIGS. 1A-1B are diagrams illustrating a schematic configuration of a transmitter and a receiver in which the multicarrier transmission method is employed.
Figure 1B:
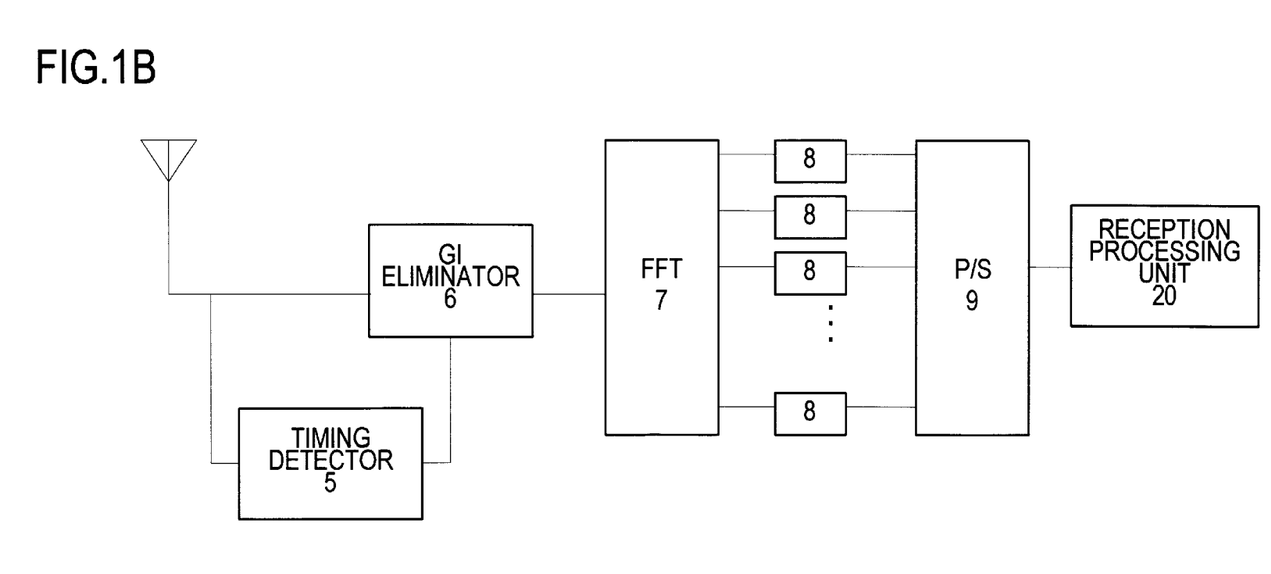

FIGS. 1A-1B are diagram illustrating a schematic configuration of a transmitter and a receiver in which the multicarrier transmission method is employed. FIG. 1A is a transmitter, and FIG. 1B is a receiver. In FIG. 1A, an input data signal is converted into a plurality of parallel symbols by means of a serial/parallel converter (S/P) 1, and by means of subcarrier modulators 2, a plurality of subcarrier signals which are complex modulated into I/Q components are generated. Also, an inverse fast Fourier transform unit (IFFT) 3 performs inverse fast Fourier transform of each subcarrier signal. To the transformed output signal, a guard interval is added by a guard interval (GI) inserter 4, and further, after being frequency converted into an RF signal (not illustrated), the signal is transmitted from an antenna.

In the receiver, an inverse operation to the transmitter is carried out. Specifically, first, a timing detector 5 detects the symbol timing (which may also be referred to as synchronous timing), that is, the position of the guard interval. The detection of the symbol timing is achieved by the known self-correlation method, by which the guard interval position is detected by the detection of self-correlation with a received signal being time-shifted by the length of an effective symbol length.

Based on the detected symbol timing, a guard interval eliminator 6 eliminates the guard interval from the received input signal, and a fast Fourier transform unit (FFT) 7 performs fast Fourier transform of the received signal, using the symbol timing as FFT start timing, so as to regenerate the plurality of subcarrier signals. Subcarrier demodulators 8 then demodulate the subcarrier signals, which are then restored to a serial signal by means of a parallel/serial converter (P/S) 9. Thus, the original data is output and demodulation processing is performed by a reception processing unit 20.

The guard interval (GI) is formed by the addition of the latter part of the symbol to the top of the symbol by duplication. By the addition of GI, it becomes possible to suppress transmission deterioration caused by intersymbol interference etc. produced in a multipath propagation path.

The multicarrier transmission method (particularly OFDM) is already put into practical use in terrestrial digital television, wireless LAN, etc. Also, in recent years, application to a wireless communication system such as mobile telephony is proceeding. At that time, a mobile station such as a mobile telephone terminal may perform handover processing to switch over base stations to communicate with. To facilitate the switchover operation to the base station for communication by the handover, the coincidence of predetermined synchronous timing, which is to be a criterion for communication, may be made between each base station.

As a means for coinciding the synchronous timing between the base stations, for example, a GPS system using GPS (Global Positioning System) and a master-slave synchronization system to subordinate a plurality of base stations by the disposition of a highly stable reference oscillator in a base station are already known.

In the GPS system, each GPS receiver is installed on the basis of a cell covered by each base station, and a reference clock being output from the GPS receiver is used as a synchronous timing signal of each base station. For this purpose, facilities such as an external antenna and a feeder line are required for the base station to obtain the reference clock from the GPS receiver.

Also, according to the master-slave system, it is necessary to introduce a reference oscillator to generate highly stable clock signals, and to provide a master-slave function from the base station having the reference oscillator installed thereon.

Further, when a mobile station starts communication with a second base station after performing handover from a first base station through which communication is in progress, there is a known method that, prior to the start of handover, the mobile station receives a monitoring slot from the second base station, so as to establish synchronization using a known pilot symbol assigned to the monitoring slot (Patent document 1). Additionally, in a wireless communication system employing a multicarrier transmission method, as a technique to simplify handover processing, there is known a technique that a subcarrier set, including a plurality of designated subcarriers, is set in each base station, and the plurality of subcarriers in the subcarrier set being set in each base station are subcarriers different from a plurality of subcarriers in a subcarrier set being set in each adjacent base station, so as to prevent the use of neighboring subcarriers within each subcarrier set (Patent document 2).

[Patent document 1] Japanese Laid-open Patent Publication No. 2002-300628.
[Patent document 2] Japanese Laid-open Patent Publication No. 2006-333452.

DISCLOSURE OF THE INVENTION

Problems to be Solved by the Invention

However, according to the aforementioned GPS system, it is necessary to provide the facilities such as the external antenna and the feeder line to obtain the reference clock from the GPS receiver, which causes restriction to receive a satellite radio wave. Moreover, the handover processing essentially needed for the wireless communication system becomes dependent on a different system, GPS.

Also, according to the above-mentioned master-slave system, there is a limitation of a base station area which is subordinate to the clock signal supplied from one reference oscillator. Although base stations which are located in the area, having the clock signals distributed from the one reference oscillator, are mutually synchronized, synchronization cannot be attained between with a base station which is located in an area belonging to another reference oscillator. This necessitates synchronization between each reference oscillator.

Furthermore, the technique disclosed in the above-mentioned patent document 1 is to establish synchronization by that the mobile station acquires phase information from the pilot symbol received from the second base station, the target of handover, prior to the handover processing. In order to acquire the phase information from the pilot symbol, the mobile station is required to have synchronous timing coincident with the second base station. When the synchronous timing between the first base station and the second base station is coincident, the mobile station can acquire the phase information from the pilot symbol, by communicating with the second base station using synchronous timing identical to the synchronous timing of the first base station. On the other hand, when the synchronous timing between the first base station and the second base station is not coincident, it becomes necessary to detect the synchronous timing of the second base station. In order that the mobile station detects the synchronous timing of the second base station, there is a known method such as a self-correlation method in which the correlation of the guard interval is measured. However, in regard to the above method, no concrete disclosure has been given in the patent document 1. Also, in order to acquire the phase information after synchronization by receiving the pilot signal from the second base station while communicating with the first base station, it is necessary to additionally provide another circuit equal to the receiver circuit. This leads to an increased circuit scale.

Accordingly, the objective of the present invention is to provide a mobile station (wireless communication device) capable of detecting the synchronous timing of a base station different from the base station being presently in communication, even if the transmission timing is not synchronized between the base stations.

Means for Solving the Objects

A first configuration of wireless communication device in one mode of the invention to attain the above objects is wireless communication device for use in a wireless communication system having a plurality of base stations for transmitting known signals using different subcarriers, which includes: a Fourier transform processing unit performing Fourier transform processing respectively on a plurality of received signal portions whose reception periods have a predetermined time difference; a selector selecting a signal corresponding to a subcarrier including the known signal, from among the signals corresponding to the plurality of subcarriers obtained by the Fourier transform processing unit; and a correlation detector performing correlation calculation to obtain correlation of the signals respectively corresponding to the plurality of subcarriers selected by the selector with the known signal, and based on the correlation obtained by the correlation calculation, selecting the synchronous timing of another base station different from the base station presently in communication, from among the start timing sets of the plurality of received signal portions.

A second configuration of wireless communication device in another mode of the invention is the wireless communication device of the first configuration, characterized in that the Fourier transform processing unit includes a plurality of Fourier transform processing circuits performing Fourier transform processing respectively on the plurality of received signal portions whose reception periods have the predetermined time difference.

A third configuration of wireless communication device in another mode of the invention is the wireless communication device of the first configuration, characterized in that the Fourier transform processing unit includes: at least one buffer storing the received signal portions; and at least one Fourier transform processing circuit reading out a received signal portion from the buffer and performing Fourier transform processing, and thereafter, reading out and performing Fourier transform processing on a received signal portion whose reception period deviates by the predetermined time.

A fourth configuration of wireless communication device in another mode of the invention is the wireless communication device of the first configuration, characterized in that the Fourier transform processing unit performs Fourier transform on the consecutive plurality of received signal portions, and outputs the average value thereof as the result of the Fourier transform processing.

A fifth configuration of wireless communication device in another mode of the invention is the wireless communication device of the first configuration, which further includes: a memory unit storing the detected synchronous timing values of the other base station being periodically detected by the correlation detector; and an update control unit weighting each detected value stored in the memory unit according to the radio wave intensity of each received signal corresponding to each detected value, and determining the synchronous timing of the other base station from the plurality of detected values in consideration of the weighting.

A sixth configuration of wireless communication device in another mode of the invention is the wireless communication device of the first configuration, which further includes: a preamble detector detecting a preamble included at the top of a received signal being demodulation processed using the synchronous timing of the other base station selected by the correlation detector, when communication is performed by means of a communication method of alternately switching transmission and reception using an identical channel, wherein the preamble detector decides the reception start timing of the received signal, based on the detection of the preamble.

A seventh configuration of wireless communication device in another mode of the invention is the wireless communication device of the first configuration, which further includes: a reception processing unit demodulating the received signal after switching to the synchronous timing of the other base station selected by the correlation detector, when handover is performed from the base station presently in communication to the other base station.

An eighth configuration of wireless communication device in another mode of the invention is the wireless communication device of the seventh configuration, which further includes: a buffer storing signal portions in an identical section of a signal from the base station presently in communication and a signal from another base station; and when the signal portions are stored in the buffer, a speed conversion processing unit increasing the processing speed of the reception processing unit.

Effect of the Invention

According to the present invention, even if the transmission timing is not synchronized between the base stations, it is possible to detect the synchronous timing of a base station different from the base station presently communicating with. Also, because the synchronous timing of another base station can be acquired in advance, smooth switchover of the base station can be achieved at the time of handover. Further, because a means for synchronizing between the base stations becomes unnecessary, the reduction of overall system cost can be achieved.

EXPLANATION OF LETTERS OR NUMERALS

10: Other station timing detector
11: FFT
12: Subcarrier selector
13: Correlation detector
14: Memory unit
15: Averaging unit
16: Update control unit
18: Preamble detector

BEST MODE FOR IMPLEMENTING THE INVENTION

The preferred embodiments of the present invention are described hereinafter referring to the charts and drawings. However, it is noted that the embodiments described below do not limit the technical scope of the present invention.

Figure 2A:
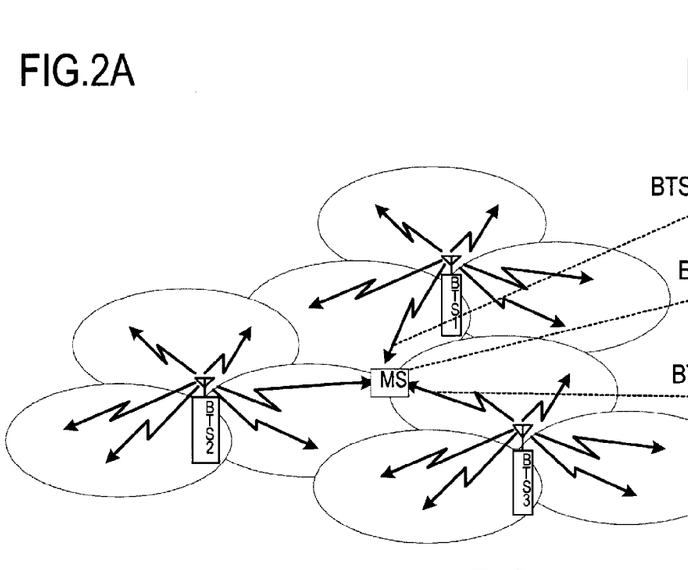
FIGS. 2A-2D are diagrams illustrating a wireless communication system according to an embodiment of the present invention.

FIGS. 2A-2D are diagrams illustrating a wireless communication system according to an embodiment of the present invention. In FIG. 2A, a mobile station MS (wireless communication device in the present invention) supervises the electric field intensity of radio waves transmitted from a plurality of base stations BTS1-BTS3 whose cells are mutually adjacent, so as to communicate with a base station producing the highest electric field intensity, and switches the base station to communicate with by handover processing when the base station producing the highest electric field intensity is changed during communication. In addition, in regard to the conditions for switchover, it is possible to set such a condition that CINR between with the base station being in communication has become lower than a predetermined threshold.

Figure 2B:
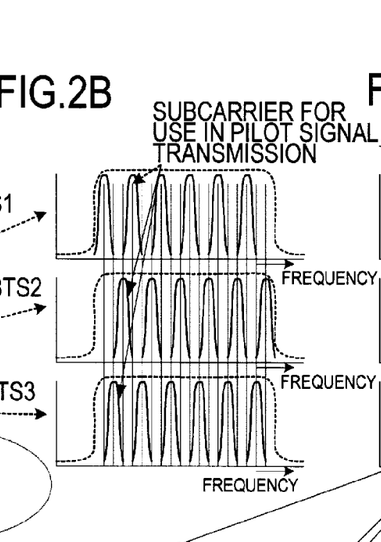

Here, each base station BTS performs communication using an identical frequency band (channel), in which subcarrier frequencies are set to be mutually different. FIG. 2B is a state that the subcarriers of each base station BTS are mutually different. Additionally, it is assumed that each subcarrier frequency for transmitting a pilot signal, as a known signal, is predetermined.

Figure 2C:
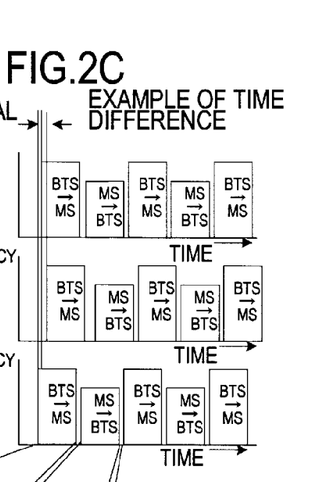
Figure 2D:
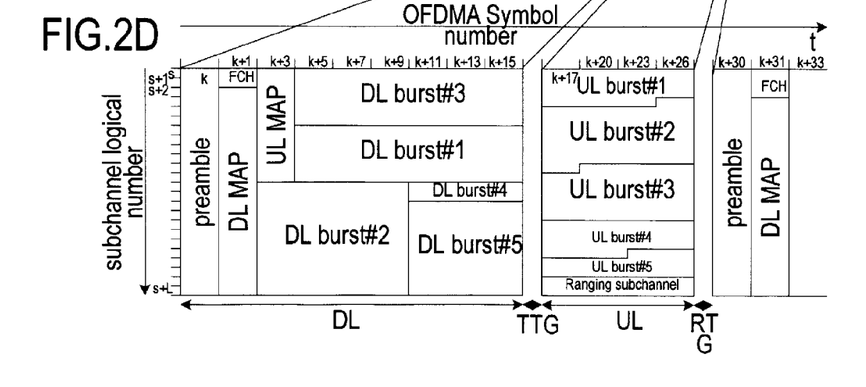

Further, as illustrated in FIG. 2C, in case of communication by a TDD (Time Division Duplex) system, transmission and reception of an uplink signal (MS→BTS) and a downlink signal (BTS→MS) are switched at high speed on a time axis, using an identical frequency. Because the base stations are not synchronized with each other, the switchover timing of the transmission and the reception differs in each base station. The deviation in the transmission/reception switchover timing produced between the base stations is roughly within TTG (or RTG), on the assumption that, between the transmission timing and the reception timing, there is not produced such a large deviation as becoming mutually contrary. FIG. 2D is a diagram illustrating an exemplary data structure of the uplink signals and the downlink signals. At the top of each downlink signal, there is attached a preamble, that is, logical information to identify the downlink signal.

As will be described later, handover with a suppressed possibility of communication disconnection can be achieved by that, while communicating with a base station presently in communication, the mobile station MS in accordance with the embodiment of the present invention acquires the synchronous timing of another base station, and switches to the synchronous timing acquired in advance when switching to the communication with the other base station having different synchronous timing.

Figure 3:
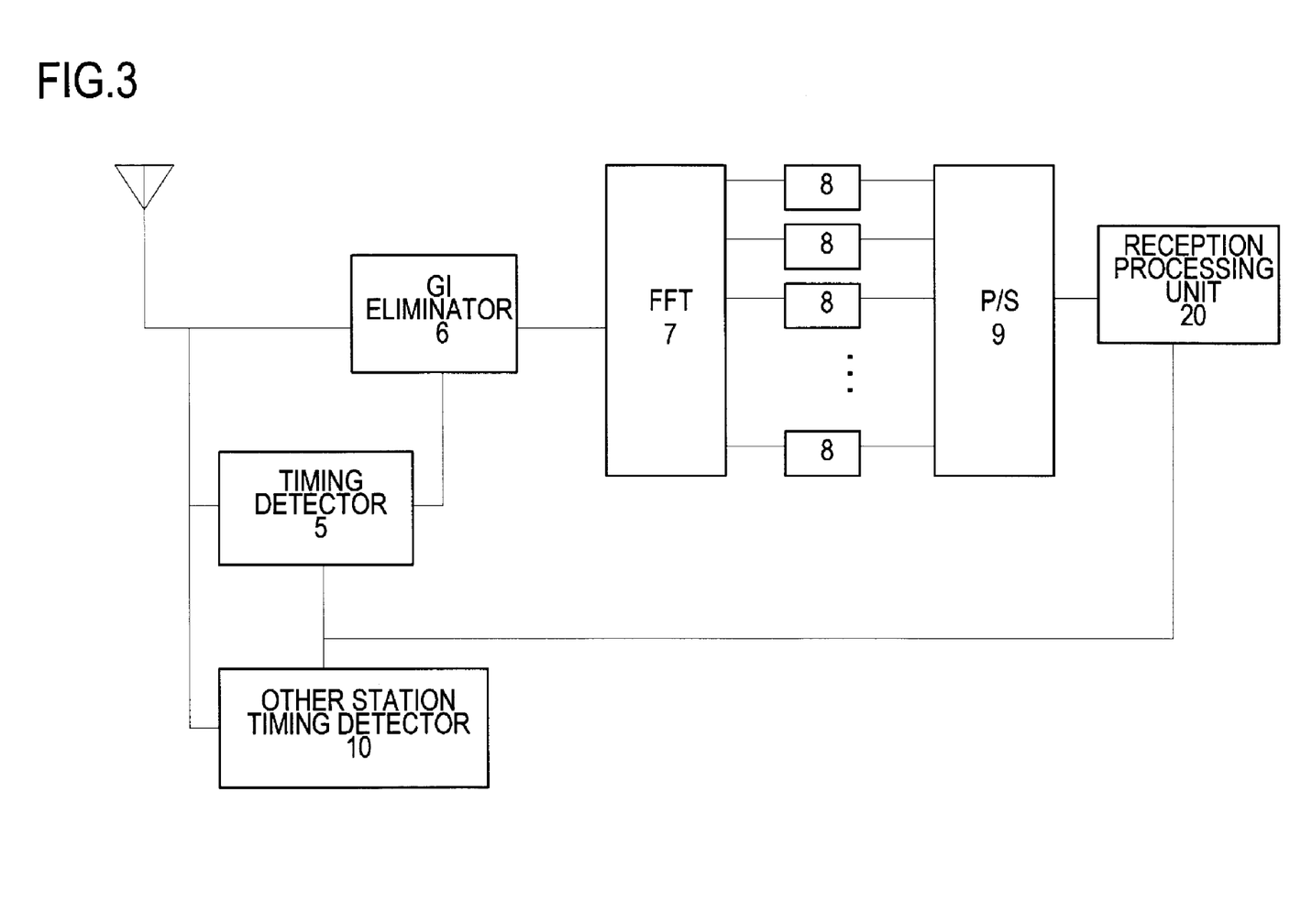
FIG. 3 is a diagram illustrating an exemplary configuration of the receiving side of the mobile station MS, wireless communication device, according to the embodiment of the present invention.

FIG. 3 is a diagram illustrating an exemplary configuration of the receiving side of the mobile station MS, wireless communication device, according to the embodiment of the present invention. Similar to the configuration illustrated in FIG. 1B, a timing detector 5 detects synchronous timing of the base station presently in communication from a received signal, by means of correlation detection such as a self-correlation system. Based on the detected synchronous timing, a guard interval eliminator 6 eliminates a guard interval from the received signal. A fast Fourier transform unit (FFT) 7 then performs fast Fourier transform of the received signal using the synchronous timing as FFT start timing, so as to regenerate a plurality of subcarrier signals. The subcarrier signals are demodulated in subcarrier demodulators 8. Then, by the restoration to a serial signal in a parallel/serial converter (P/S) 9, the original data is output, on which demodulation processing is performed in a reception processing unit 20.

Further, the mobile station MS includes an other base station timing detector 10. The other base station timing detector 10 extracts and stores synchronous timing of the other base station (s), from the received signal being received from one or a plurality of other base stations, other than the base station presently in communication.

Figure 4:
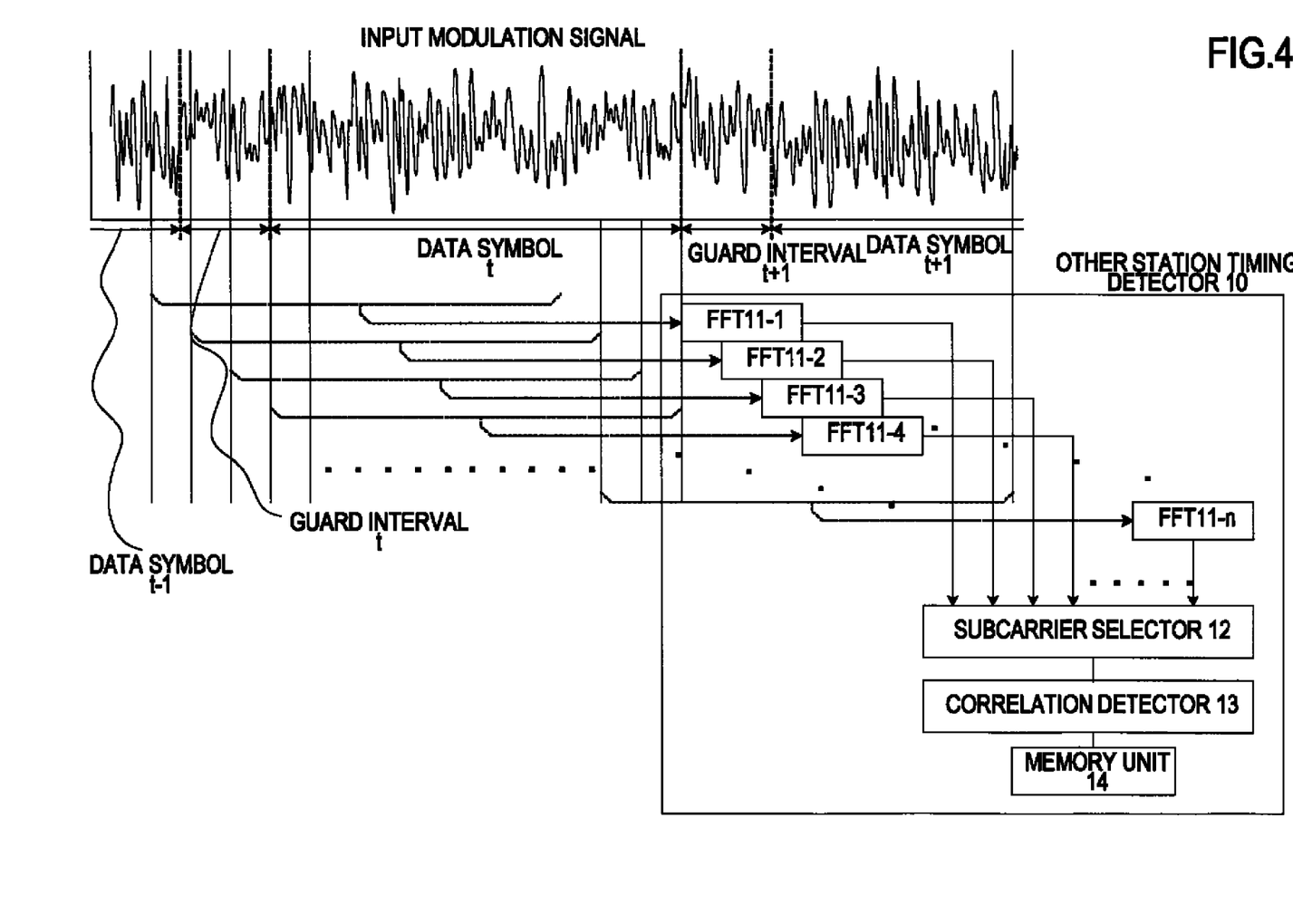
FIG. 4 is a first exemplary block configuration of other base station timing detector 10.

FIG. 4 is a first exemplary block configuration of other base station timing detector 10. In FIG. 4, other base station timing detector 10 includes a plurality of fast Fourier transform units (FFT) 11-$n$ (which may be referred to as FFT 11 when generically named without discrimination of each FFT); and from among the plurality of subcarrier signals output from each FFT 11, a subcarrier selector 12 for selecting a single subcarrier or a plurality of subcarriers (here, it is assumed that each pilot signal is assigned to a subcarrier of one frequency) each constituted of a frequency having a known pilot signal assigned from each other base station; a correlation detector 13 for detecting correlation by performing correlation calculation between the known pilot signal and the received signal being received from the selected subcarrier constituted of the frequency, and for selecting the synchronous timing of the other base station, different from the base station being in communication, from among the sets of the FFT start timing of each FFT, based on the correlation obtained from the correlation calculation; and based on the detected correlation, a memory unit 14 for storing the FFT start timing and the period thereof, as synchronous timing of the other base station.

Preferably, in regard to each of the plurality of other base stations, FFT start timing achieving maximum correlation and the period thereof are stored. At that time, it may be possible to store the timing by restricting to the plurality of other base stations producing correlation values exceeding a predetermined threshold, or it may also be possible to store the timing in regard to only one base station achieving the maximum correlation value among the plurality of other base stations.

As illustrated in the figure, the FFT start timing of the plurality of FFT 11-$n$ is mutually shifted. For example, in the order of FFT 11-1, FFT 11-2 . . . , the FFT start timing is set in such a manner as to have a delay on a predetermined section-by-section basis. The signal length to be Fourier transformed by each FFT is identical. The signal length is a symbol data length (symbol length) having a guard interval added thereto, and the above length is already known. At this time, high correlation is obtained from the output of FFT (FFT 11-4 in the example illustrated in FIG. 4) which Fourier transforms a signal having a length exactly corresponding to the data symbol. From the period of the FFT achieving the highest correlation, synchronous timing can be obtained. On completion of Fourier transform at the start timing of the last FFT 11-$n$, the process returns to FFT 11-1. By use of the timing at which a predetermined delay elapses from the start timing of FFT 11-$n$, as start timing, Fourier transform for each predetermined signal length is successively continued from FFT 11-1.

The start timing interval of each FFT is a time shorter than the symbol length, and preferably, is shifted by L/N, obtained by dividing the symbol length L into N, and thus, there are provided FFT of N units in number. The number of FFT may be on the order of 16 (N=16) as an example, or may be more than the above number or less. The more the number of FFT is increased, the narrower the timing interval can be made, and thus, the resolution of the synchronous timing detection can be improved. According to the circuit scale and the detection accuracy, an optimal number of FFT is set.

From each FFT output, subcarrier selector 12 selects a subcarrier having a pilot signal assigned thereto, and correlation detector 13 compares a received signal corresponding to each selected subcarrier with the known pilot signal. Then, among them, the correlation with a subcarrier in FFT (FFT 11-4 in the example illustrated in FIG. 4), by which Fourier transform is made on a signal in a section entirely including the data symbol portion, becomes the highest. Thus, the FFT start timing producing the maximum correlation can be detected as the synchronous timing of the other base station. Because the subcarrier frequency having the pilot signal assigned thereto is different depending on each base station, by selecting the subcarrier frequency of a base station for which synchronous timing detection is required, it is possible to extract the synchronous timing of a particular base station from among the plurality of other base stations.

Here, it may also be possible that a memory unit for storing a signal obtained from each FFT is provided in subcarrier selector 12, so as to store FFT output results, and that the stored data of a corresponding subcarrier is output to correlation detector 13 when performing correlation calculation in correlation detector 13. By this, it becomes unnecessary to perform separate FFT processing each time a base station targeted for correlation calculation is switched. Needless to say, without the provision of the memory unit, it may be possible to supply received data corresponding to each subcarrier, including the pilot signal (preferably, received data corresponding to the entire subcarriers targeted for correlation calculation) to correlation detector 13 in parallel, so that correlation detector 13 may perform correlation calculation with the pilot signal for each subcarrier in parallel.

Figure 5:
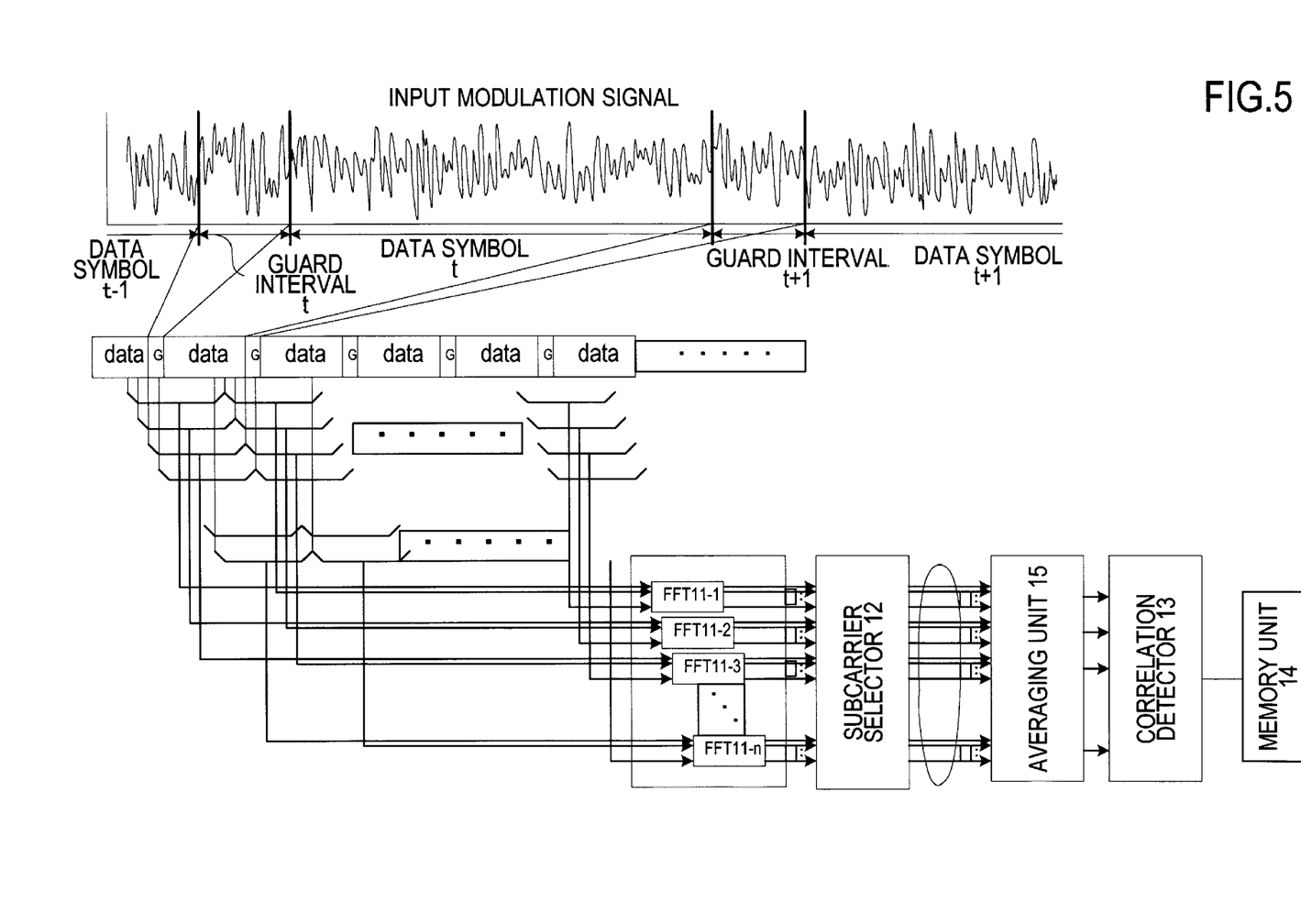
FIG. 5 is a second exemplary block configuration of other base station timing detector 10.

FIG. 5 is a second exemplary block configuration of other base station timing detector 10. In the second exemplary configuration, each FFT performs Fourier transform continuously for a plurality of times (twice in the example illustrated in FIG. 5), taking the start timing of the self as a criterion, and an averaging unit 15 averages each FFT output. Based on the average output, correlation detector 13 obtains correlation. By averaging the plurality of times of FFT outputs, it is possible to eliminate the influence of an instantaneous noise etc., and to improve accuracy in correlation decision.

Figure 6:
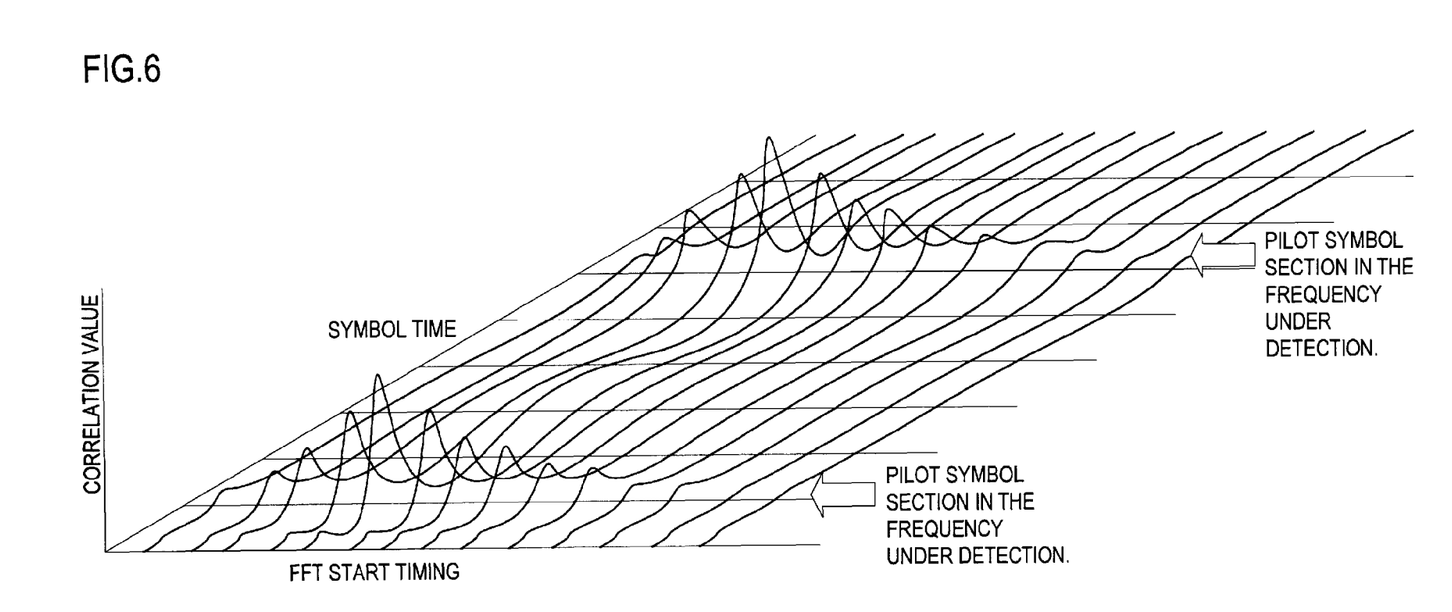
FIG. 6 is a diagram illustrating relationship between FFT start timing and correlation.

FIG. 6 is a diagram illustrating relationship between FFT start timing and correlation. Typically, FIG. 6 illustrates correlation relationship when each FFT in the second exemplary configuration, illustrated in FIG. 5, performs Fourier transform twice in a consecutive manner. There is illustrated a state that the highest correlation is produced when FFT is performed for the section entirely including the data symbol (pilot symbol).

Figure 7:
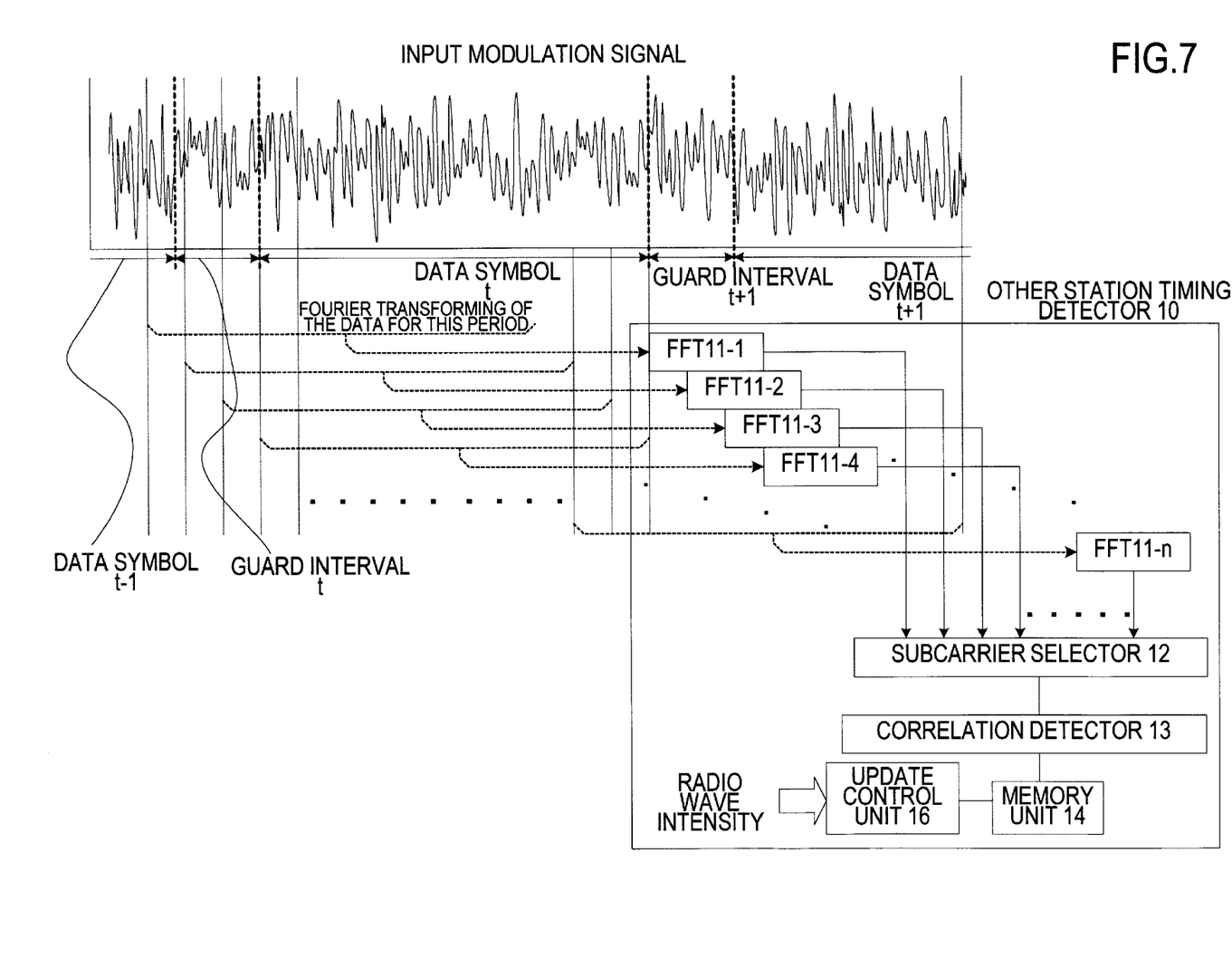
FIG. 7 is a diagram illustrating a third exemplary block configuration of other base station timing detector 10.

FIG. 7 is a diagram illustrating a third exemplary block configuration of other base station timing detector 10. In the third exemplary configuration, an update control unit 16 updates the synchronous timing of other base stations stored in memory unit 14. During the communication with a presently communicating base station, FFT 11 repeats Fourier transform processing on received signals, and therefore, correlation detector 13 also obtains the synchronous timing of the other base stations in a periodically repeated manner. Memory unit 14 may overwrite the synchronous timing detected for each of the other base stations to the most updated synchronous timing at appropriate times, or may update the synchronous timing stored in memory unit 14 after correcting it by using the most updated synchronous timing at appropriate times. Specifically, the synchronous timing periodically detected for each of the other base stations is stored in memory unit 14 as a detected value at each detection time, and weighting is made on each of the synchronous timing (detected value). The weight is set according to the radio wave intensity of the received signal, for example. When the radio wave intensity is strong, a large weight is added, while when the radio wave intensity is weak, a small weight is added. In consideration of the above weight, for example, an average value of the accumulated synchronous timing values (detected values) is obtained, which is determined to be the synchronous timing of the other base station and stored into memory unit 14. Because it is highly possible that the synchronous timing obtained during a weak radio wave intensity may include an error, the degree of influence is made small. Also, by the accumulation and averaging, detection accuracy is improved.

Figure 8:
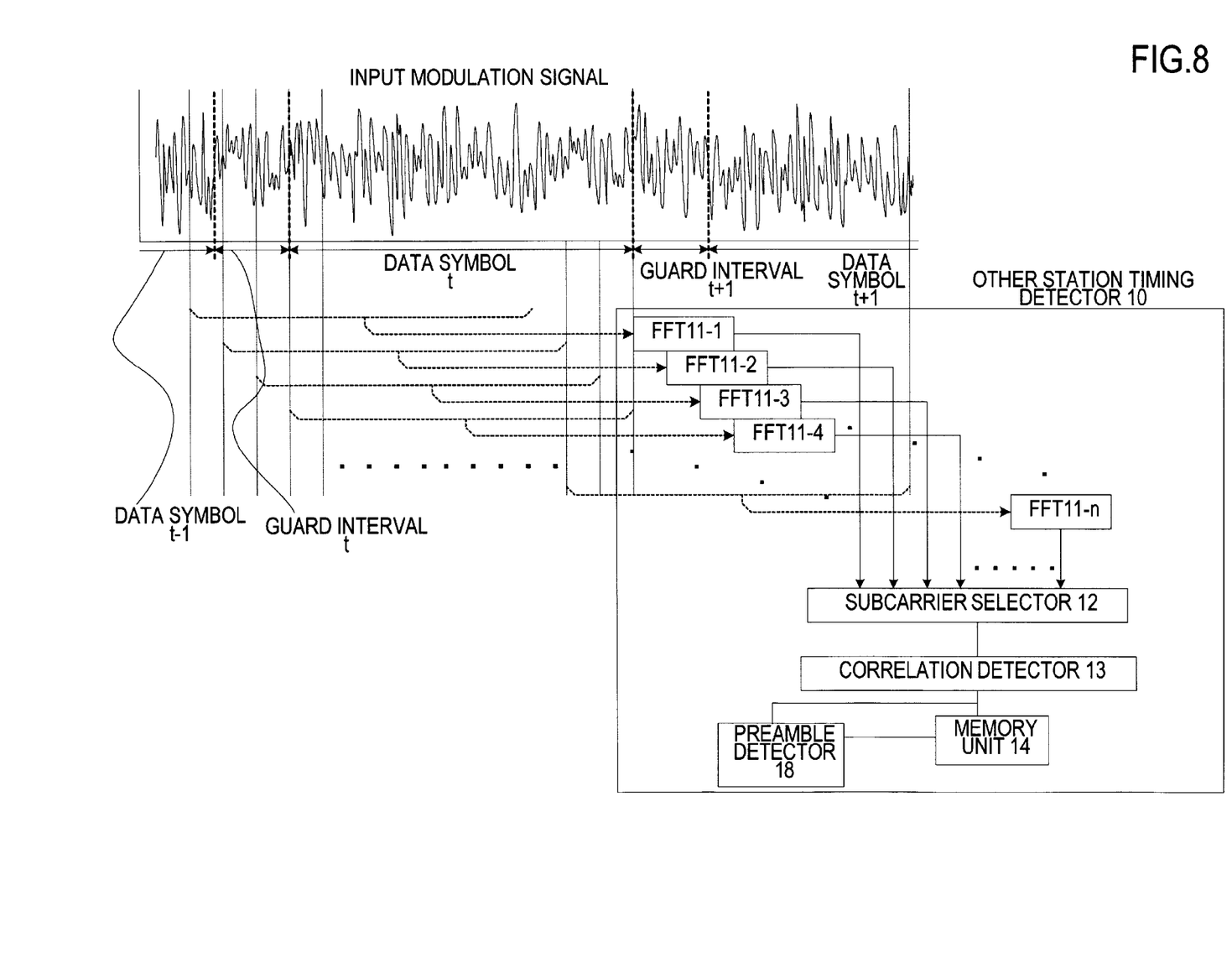
FIG. 8 is a fourth exemplary block configuration of other base station timing detector 10.

FIG. 8 is a fourth exemplary block configuration of other base station timing detector 10. In the fourth exemplary configuration, a preamble detector 18 detects a preamble included in a downlink signal (signal transmitted from the base station BTS to the mobile station MS), from the signal having been received on the basis of the synchronous timing obtained by correlation detector 13. The preamble, logical information, is a known pattern data. By that the base station MS detects the preamble in the downlink signal of the other base station, transmission/reception switchover timing in the other base station of TDD (Time Division Duplex) communication can be decided. As illustrated in FIG. 2D, each frame section of the uplink signal and the downlink signal has a length (which is known) having an integer multiple of the symbol data. By obtaining the preamble in the downlink signal having a known pattern data embedded therein, it is possible to know transmission/reception switchover timing. Preamble detector 18 compares the signal, received on the basis of the synchronous timing obtained in correlation detector 13, with the pattern data given in advance for each symbol data, and determines that symbol data timing coincident with the pattern data is the reception start timing of the downlink signal. Because each length of the downlink signal section and the uplink signal section is preset, it is further possible to determine the transmission start timing of the uplink signal, taking the reception timing of the downlink signal as a criterion. The reception start timing information of the downlink signal is stored into memory unit 14. At the time of handover, TDD communication with the base station after the switchover is performed according to the reception start timing information stored in memory unit 14.

Figure 9:
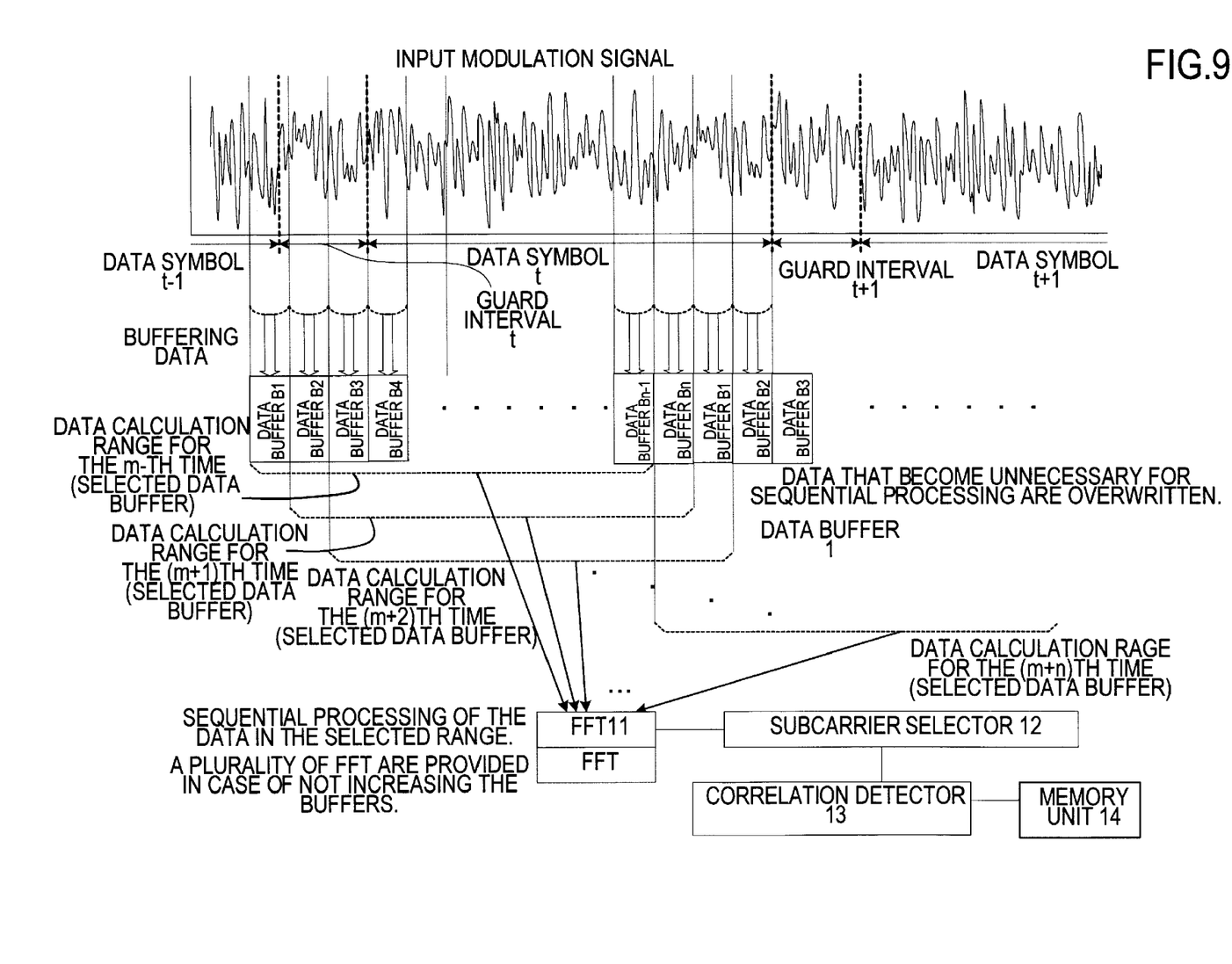
FIG. 9 is a fifth exemplary block configuration of other base station timing detector 10.

FIG. 9 is a fifth exemplary block configuration of other base station timing detector 10. In the fifth exemplary block configuration, with the preparation of a plurality of data buffers B1-Bn (hereafter referred to as data buffer B when generically named) for storing data corresponding to the delay time of the FFT start timing, and by means of a single or a plurality of FFT 11, data in a calculation range deviating from the FFT start timing are read out from the data buffer B, so that Fourier transform processing is performed sequentially.

For example, one FFT 11 reads out data buffers B2-Bn−1 as a data calculation (Fourier transform processing) range for the m-th time, so as to perform Fourier transform processing, and thereafter, reads out data buffers B3-Bn as a data calculation range for the (m+1) th time, so as to perform Fourier transform processing.

At this time, because the data in the data buffer B2 deviates from the data calculation range for the next time and after, it is possible to use as a new data memory area. According to the processing speed of a one-time calculation in FFT 11, a necessary amount of data buffer B is provided. Also, when there is restriction in the capacity of the data buffer B, calculation processing capability can be improved by increasing FFT 11 to a necessary number of units, and by making parallel processing. Additionally, when there are a plurality of base stations targeted for obtaining correlation, it is also possible to retain data in the data buffer until the completion of the entire correlation calculations for the above plurality of base stations, so that the stored identical data may be read out and used in the correlation calculation.

Figure 10:
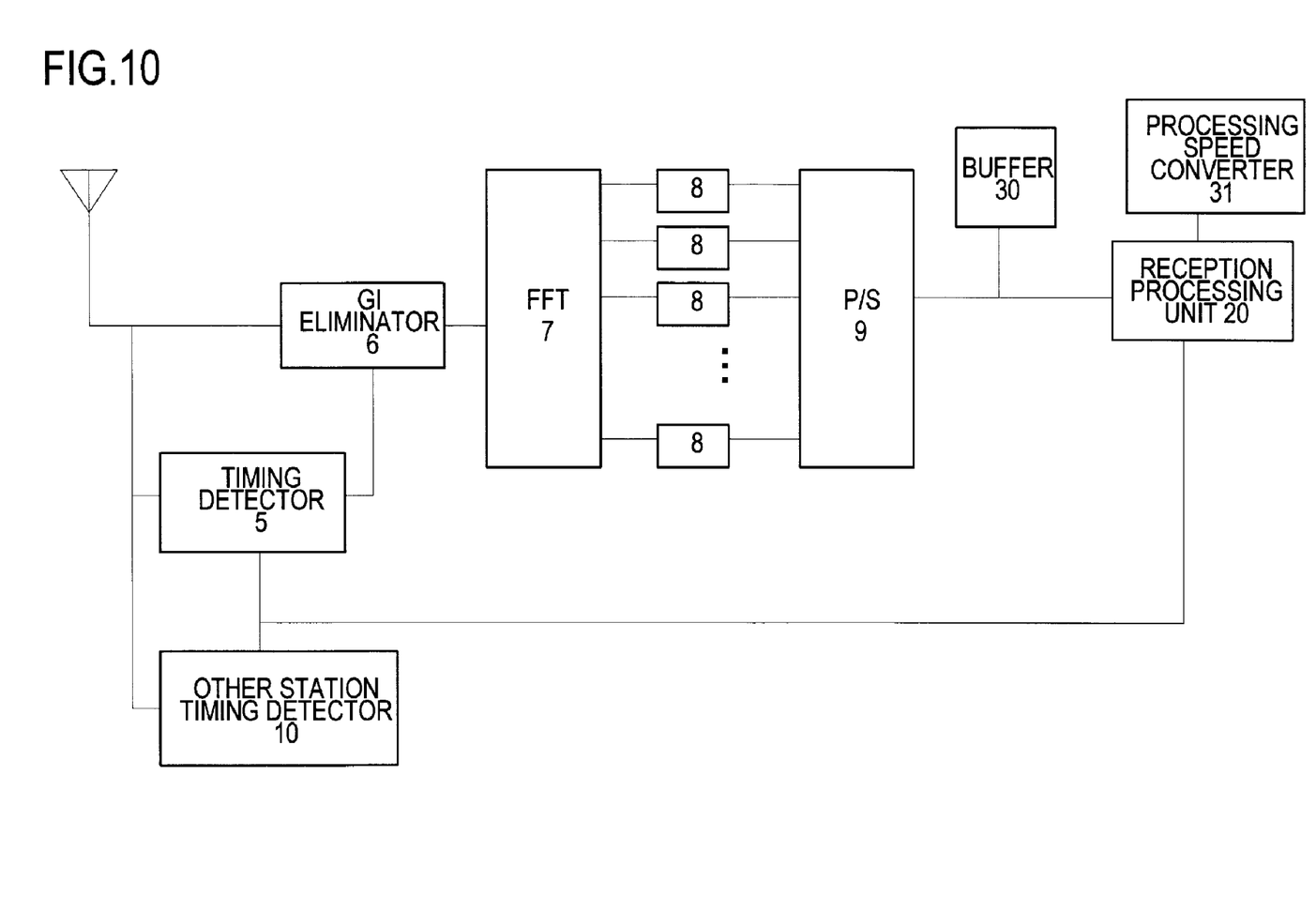
FIG. 10 is another exemplary configuration of the receiving side of the mobile station MS, wireless communication device, according to the embodiment of the present invention.

FIG. 10 is another exemplary configuration of the receiving side of the mobile station MS, wireless communication device, according to the embodiment of the present invention. In addition to other base station timing detector 10 illustrated in FIGS. 3 through 9, a buffer 30 and a processing speed converter 31 are provided. In synchronous timing switchover at the time of handover, an instantaneous communication interruption is avoided by performing reception processing of both signals corresponding to identical data being received from a base station before switchover and after switchover. At that time, both data mutually deviate by the time difference of synchronous timing, and however, at least a portion in one symbol data section overlaps on a time axis. In order to perform demodulation processing of the both data without discarding any one of the data, there are provided buffer 30 for temporarily storing both data, and processing speed converter 31 for temporarily increasing processing speed. Buffer 30 temporarily stores data received during an overlapped time at the switchover of the synchronous timing. Further, when the data is stored in buffer 30, to release it, processing speed converter 31 temporarily increases the processing speed, so as to process the both data. When the data stored in buffer 30 are cleared, restoration to an ordinary processing speed is made.

Further, a subcarrier for transmitting the pilot signal may not necessarily be a subcarrier which transmits the pilot signal only. For example, it may be possible to configure in such a manner that the pilot signal is transmitted at a certain period by a subcarrier.

Figure 11A:
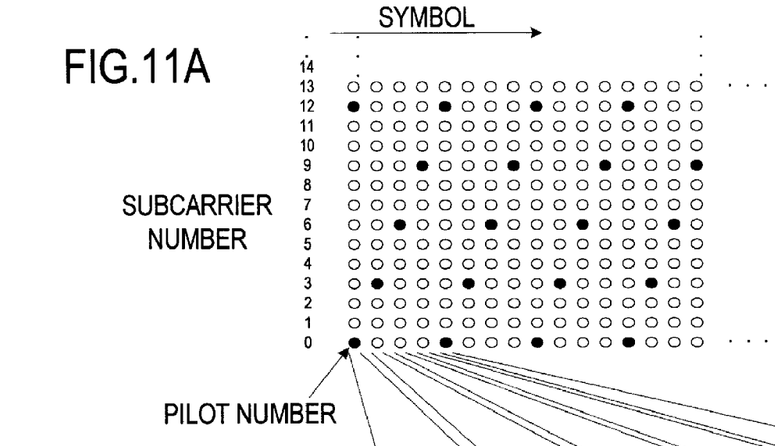
FIGS. 11A-11B are diagrams illustrating an exemplary allocation pattern of the pilot signal in a subcarrier.
Figure 11B:
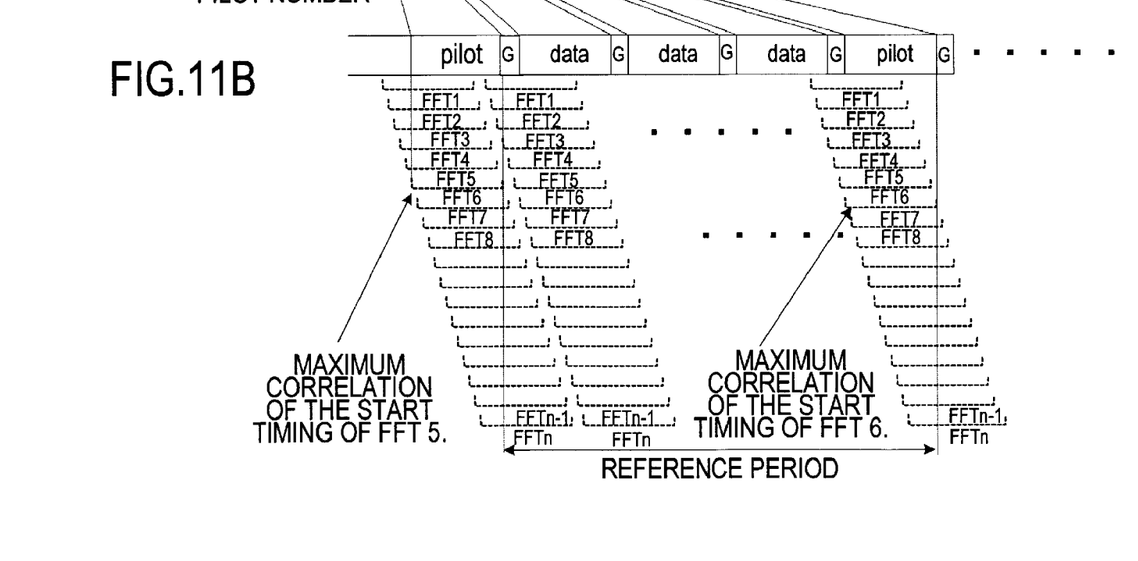

FIGS. 11A-11B are diagrams illustrating an exemplary allocation pattern of the pilot signal in a subcarrier. In FIG. 11A, among a plurality of subcarriers, the pilot signals are allocated in the subcarriers at predetermined frequency intervals (in the figure, at the intervals of subcarrier numbers). Also, in the subcarriers having the allocated pilot signals, the pilot signals are allocated at the intervals of predetermined symbol numbers. In FIG. 11A, each pilot signal is allocated at the intervals of 4 symbols.

Further, as illustrated in FIG. 11B, even in case that the pilot signals are transmitted at constant intervals, if the transmission period of the above each pilot signal is already known, the start timing and the period thereof in the symbol corresponding to the pilot signal can be detected by continuing to perform FFT with shifted start timing. The start timing and the period thereof corresponding to one symbol can be detected in consideration of the transmission period of the above pilot signals (that is, in consideration of the number of symbols included in the period (reference period) of the detected start timing).

As described above, according to the present embodiment, the mobile station performs Fourier transform of a signal received from a base station presently in communication in parallel to demodulation processing, by means of a plurality of FFT each having FFT start timing shifted one after another, so as to detect the synchronous timing of another base station by detecting correlation through a pattern comparison with a subcarrier signal including the pilot signal of the other base station. Because the synchronous timing of the other base station can be acquired irrespective of whether or not the base stations are mutually synchronized, a configuration to mutually synchronize the base stations becomes unnecessary, and thus, cost reduction in the overall wireless communication system can be realized. In regard to the mobile station, without the addition of a new receiving function other than a circuit (receiving function) for demodulating signals received from the base station presently in communication, it is possible to realize only by adding FFT units constituted of a plurality of stages and a simple function having a correlation detection function. It is possible to process by a mounted processor configurable of digital processing only, which enables the reduction of cost increase with a maintained compact size of the mobile station.

At the time of handover, even when transmission timing is not synchronized between the base stations, the mobile station MS already acquires the synchronous timing of another base station by the synchronous timing detection processing of the other base station according to the present invention. Accordingly, without producing a communication disconnection at the time of communication switchover, it is possible to perform prompt handover processing by starting reception processing of a signal transmitted from the other base station, according to the synchronous timing of the other base station. Further, when the mobile station MS starts communication with a certain base station, it is also possible to apply to the detection processing of synchronous timing of the above base station, without limitation to the handover processing.

Additionally, using FFT 7 in common with FFT 11-1, it is also possible to use the output of FFT 7 for both reception processing in regard to the base station presently in communication and correlation calculation in regard to the other base station.

In the aforementioned exemplary embodiments, a mobile station in a wireless communication system has been described as an example of a wireless communication device according to the present invention. However, it is also possible that the wireless communication device according to the present invention is a base station in a wireless communication system. The processing of the present invention is applicable to such a case that the base station detects the transmission timing (synchronous timing) of the mobile station.

APPLICABILITY OF INDUSTRY

The present invention is applicable to a mobile station in a wireless communication system using a multicarrier transmission method [for example, OFDM (Orthogonal Frequency Divisional Multiplexing, including OFDMA)].

What is claimed is:

1. Wireless communication device for use in a wireless communication system having a plurality of base stations for transmitting known signals using different subcarriers, comprising:
   a Fourier transform processing unit performing Fourier transform processing respectively on a plurality of received signal portions whose reception periods have a predetermined time difference;
   a selector selecting a signal corresponding to a subcarrier including the known signal, from among the signals corresponding to the plurality of subcarriers obtained by the Fourier transform processing unit; and
   a correlation detector performing correlation calculation to obtain correlation of the signals respectively corresponding to the plurality of subcarriers selected by the selector with the known signal, and selecting the synchronous timing of another base station different from the base station presently in communication, from among the start timing sets of the plurality of received signal portions based on the correlation obtained by the correlation calculation.

2. The wireless communication device according to claim 1,
   wherein the Fourier transform processing unit includes a plurality of Fourier transform processing circuits performing Fourier transform processing respectively on the plurality of received signal portions whose reception periods have the predetermined time difference.

3. The wireless communication device according to claim 1,
   wherein the Fourier transform processing unit includes:
   at least one buffer storing the received signal portions; and
   at least one Fourier transform processing circuit reading out a received signal portion from the buffer and performing Fourier transform processing, and thereafter, reading out and performing Fourier transform processing on a received signal portion whose reception period deviates by the predetermined time.

4. The wireless communication device according to claim 1,
   wherein the Fourier transform processing unit performs Fourier transform on the consecutive plurality of received signal portions, and outputs the average value thereof as the result of the Fourier transform processing.

5. The wireless communication device according to claim 1, further comprising:
   a memory unit storing the detected synchronous timing values of the other base station being periodically detected by the correlation detector; and
   an update control unit weighting each detected value stored in the memory unit according to the radio wave intensity of each received signal corresponding to each detected value, and determining the synchronous timing of the other base station from the plurality of detected values in consideration of the weighting.

6. The wireless communication device according to claim 1, further comprising:
   a preamble detector detecting a preamble included at the top of a received signal being demodulation processed using the synchronous timing of the other base station selected by the correlation detector, when communication is performed by means of a communication method of alternately switching transmission and reception using an identical channel,
   wherein the preamble detector decides the reception start timing of the received signal, based on the detection of the preamble.

7. The wireless communication device according to claim 1, further comprising:
   a reception processing unit demodulating the received signal after switching to the synchronous timing of the other base station selected by the correlation detector, when handover is performed from the base station presently in communication to the other base station.

8. The wireless communication device according to claim 7, further comprising:
   a buffer storing signal portions in an identical section of a signal from the base station presently in communication and a signal from another base station; and
   when the signal portions are stored in the buffer, a speed conversion processing unit increasing the processing speed of the reception processing unit.

* * * * *